United States Patent [19]

Tsukada

[11] Patent Number: 5,494,354
[45] Date of Patent: Feb. 27, 1996

[54] SEAL DEVICE FOR A LINEAR GUIDE

[75] Inventor: Toru Tsukada, Gunma, Japan

[73] Assignee: NSK Ltd., Tokyo, Japan

[21] Appl. No.: 255,741

[22] Filed: Jun. 7, 1994

[30] Foreign Application Priority Data

Jun. 7, 1993 [JP] Japan .................................. 5-136113

[51] Int. Cl.$^6$ ................................................ F16C 29/06
[52] U.S. Cl. ................................ 384/13; 384/45; 384/15
[58] Field of Search .............................. 384/15, 45, 43, 384/44, 13; 464/168

[56] References Cited

U.S. PATENT DOCUMENTS

| | | | |
|---|---|---|---|
| 4,005,913 | 2/1977 | Thomson | 384/43 |
| 4,953,988 | 9/1990 | Tsukada | 384/45 |
| 5,139,347 | 8/1992 | Hattori | 384/15 |
| 5,399,023 | 3/1995 | Winkelmann et al. | 384/13 |

*Primary Examiner*—Lenard A. Footland
*Attorney, Agent, or Firm*—Sughrue, Mion, Zinn, Macpeak & Seas

[57] ABSTRACT

A linear guide provides a guide rail, rolling elements, a slider, and a seal device secured to the slider to close the gap between the inner surface of the slider and the outer surface of the guide rail, the seal device has a seal lip which is made of a rubber or synthetic resin, containing the lubricant. When the slider is mounted on the guide rail, the seal lip contacts with the outer surface of the guide rail to close the gap between the inner surface of the slider and the outer surface of the guide rail. The lubricant contained in the seal lip gradually oozes out to the drag surfaces of the linear guide.

9 Claims, 3 Drawing Sheets

SEAL DEVICE FOR A LINEAR GUIDE

BACKGROUND OF THE INVENTION

The present invention relates to an improvement of a seal device provided for a linear guide which is used with machine tools, industrial machines, and so forth.

A conventional linear guide of this type, as shown in FIGS. 5 and 6, provides: a guide rail 1 which is laid axially of the linear guide; and a slider 2 substantially U-shaped in section which is movably mounted on the guide rail 1. First ball rolling grooves 3 are formed in both side (right and left) surfaces of the guide rail 1. The slider 2 includes a slider body 2A having right and left wings 4 in the inner surfaces thereof, so that the slider 2 is substantially U-shaped in section by the right and left wings 4. As shown in FIG. 6, second ball rolling grooves 5 are formed so that the second ball rolling grooves 5 are confronted with the above-described first ball rolling grooves 3 when the slider is mounted on the guide rail. A number of balls 6 serving as rolling elements are rollingly set between the first and second ball rolling grooves 3 and 5, so that the slider 2 is axially moved on the guide rail 2 while rolling the balls 6. Ball returning paths 7 are formed in the wings 4 of the slider body 2A, while arcuate paths 8 are formed in two end caps 2B substantially U-shaped in section which are set on the front and rear ends of the slider body 2A, respectively, thus forming endless ball circulating paths.

In each of the ball circulating paths, the balls 6 rolling between the guide rail 1 and the slider 2 are advanced in the path defined by the ball rolling grooves 3 and 5 in the direction of movement of the slider 2 at a speed lower than the speed of the slider 2 to one end portion of the slide body 2A, where they are guided by the arcuate path 8 into the ball returning path 7 while making a U-turn. The balls 6 thus guided are moved along the ball returning path 7 to the other end portion of the slider body 2A, where they are guided by the arcuate path 8 into the path defined by the ball rolling grooves 3 and 5 while making a U-turn in the opposite direction.

In FIG. 5, reference character q designates a grease nipple through which lubricant is supplied to the ball rolling paths in the slider 2. In FIG. 6, reference character H designates holders which prevent the balls 6 from coming off when the slider 2 is disengaged from the guide rail 1.

If foreign matters such as dust and chips enter the gaps between the guide rail 1 and the slider 2 mounted on the guide rail 1 to stick onto the surfaces of the ball rolling grooves, they obstruct the smooth rolling of the balls 6. In order to overcome this difficulty, a pair of side seals 10 and a pair of under seals 11 are mounted on the slider 2. That is, the side seals 10 are set on the front and rear end faces 2c of the slider 2, respectively, to prevent the entrance of foreign matters into the slider through the gaps which are formed between the guide rail 1 and the front and rear end faces of the slider 2 (hereinafter referred to as "side gaps", when applicable). The under seals 11 are mounted on the lower surfaces of the right and left wings 4, respectively, to prevent the entrance of foreign matters into the slider through the gaps which are formed between the lower surfaces of the right and left wings 4 and the right and left side surfaces 1b of the guide rail 1 (hereinafter referred to as "under gaps", when applicable).

Each of the side seals 10 is formed by welding a nitrile or urethane rubber to a steel plate U-shaped in section. The side seals 10 thus formed are fixedly secured to the front and rear end caps 2B of the slider 2 with bolts so that they are in slide contact with the surfaces of the guide rail 1 to prevent the entrance of foreign matters through the side gaps.

Each of the under seals 11 is formed by welding a nitrile or urethan rubber to an elongated steel plate. The under seals 11 thus formed are used as non-contact seals. That is, they are fixedly secured to the lower surfaces of the right and left wings 4 with rivets so that the seal lips of the under seals 11 thus secured are extremely slightly spaced from the right and left side surfaces 1b of the guide rail 1, respectively, to the extent that the entrance of foreign matters through the under gaps is prevented.

In the conventional linear guide, the side seals and the under seals are made of nitrile or urethan rubber which is not of self-lubricating type. Hence, in order to reduce the friction between those seals and the guide rail thereby to minimize the wear of them and to allow the linear guide to smoothly operate, heretofore external lubrication is employed. Therefore, in the case where the linear guide is used under the circumference that cutting oil sprinkles on it, no problems occur with it. However, if it is used under the circumference that foreign matters such as wooden particles and molding powder sprinkle over it, then those foreign matters absorb the lubricant, as a result of which the seals are acceleratively worn out, so that the linear guide becomes unsatisfactory in operation.

Furthermore, in the case of the conventional under seals of the linear guide, in order to reduce the frictional resistance between the right and left side surfaces 1b of the guide rail and the lips of the under seals, there are provided slight gaps between them, or the seal lips lightly touch the right and left side surfaces 1b of the guide rail if they are used as contact seals. Therefore, the under seals thus arranged will not adversely affect the operability of the slider 2; however, they, being low in sealing performance, cannot completely prevent the entrance of small foreign matters such as dust into the slider 2.

SUMMARY OF THE INVENTION

Accordingly, an object of the present invention is to eliminate the above-described difficulties accompanying a conventional linear guide.

More specifically, an object of the present invention is to provide a seal device for a linear guide which, even when the linear guide is used under the circumference that foreign matters such as wooden particles and molding powder, are maintained low in wear rate, so that the linear guide is kept high in operability at all times.

The foregoing object and other objects of the present invention have been achieved by the improvement of a linear guide providing: a guide rail having first roller rolling grooves which are extended axially; a plurality of rolling elements; a slider having second roller rolling grooves confronted with the first roller rolling grooves, and arcuate paths communicating the second roller rolling grooves with the o roller returning paths, and the slider being moved on the guide rail through a number of rollers rolling in the second roller rolling grooves; and a seal device secured to the slider for closing the gap between the inner surface of the slider and the outer surface of the guide rail, in which, according to the present invention, the seal device has a seal lip which is made of a rubber or synthetic resin, containing a lubricant, in such a manner that, when the slider is mounted on the guide rail, the seal lip contacts with the outer surface of the guide rail to close the gap between the inner surface of the slider and the outer surface of the guide rail.

The seal device of the linear guide is self-lubricative because its lip is made of the rubber or synthetic resin which contains the lubricant, respectively. During operation, the lubricant contained in the seal device gradually oozes out to the drag surfaces of the linear guide. Hence, even if the linear guide is operated under the circumference that foreign matters such as wooden particles and molding powder sprinkle over it, the linear guide is satisfactorily lubricated.

The nature, utility and principle of the present invention will be more clearly understood from the following detailed description and the appended claim when read in conjunction with the accompanying drawings.

DETAILED DESCRIPTION OF THE PREFERRED EMBODIMENTS

Figure 4A:
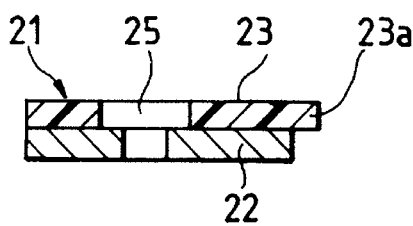
FIG. 4(a) is a sectional view showing essential components of one modification of an under seal according to the present invention.
Figure 4B:
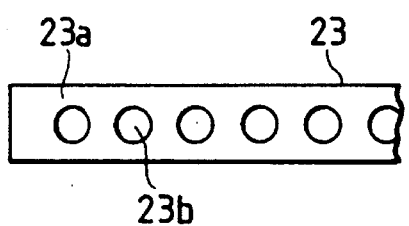
FIG. 4(b) is a bottom view of another modification of the under seal.
Figure 5:
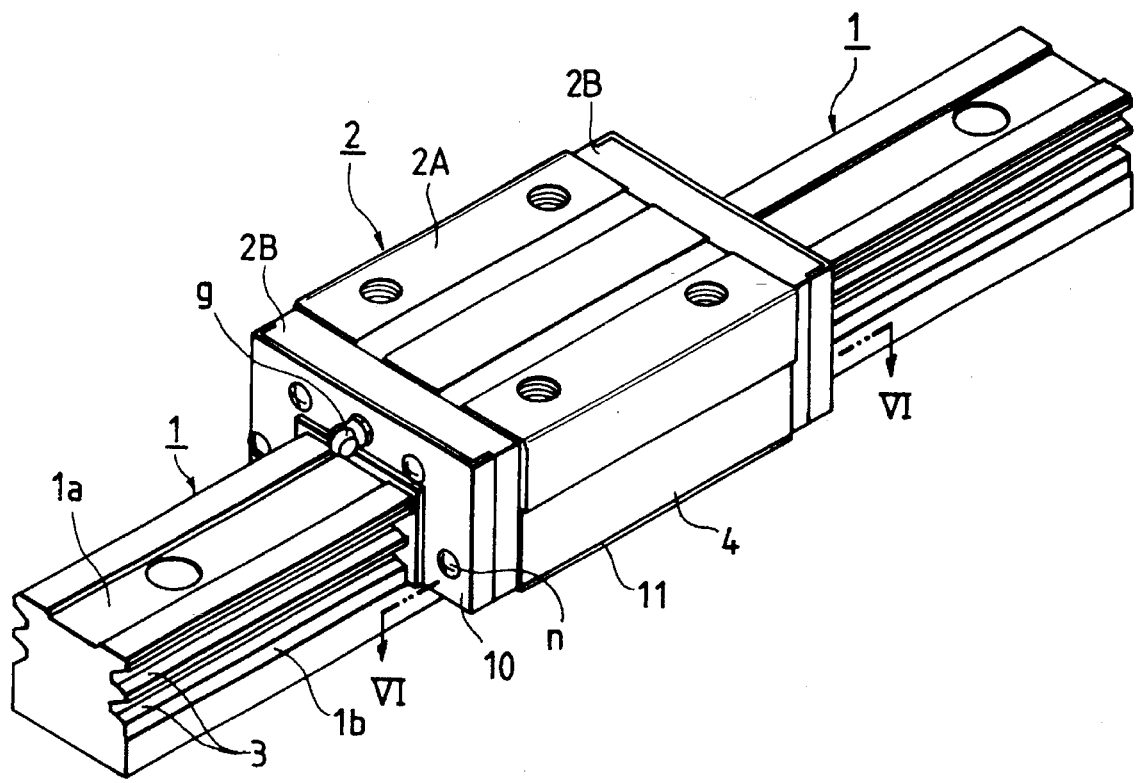
FIG. 5 is a perspective view showing a linear guide with a conventional seal device.
Figure 6:
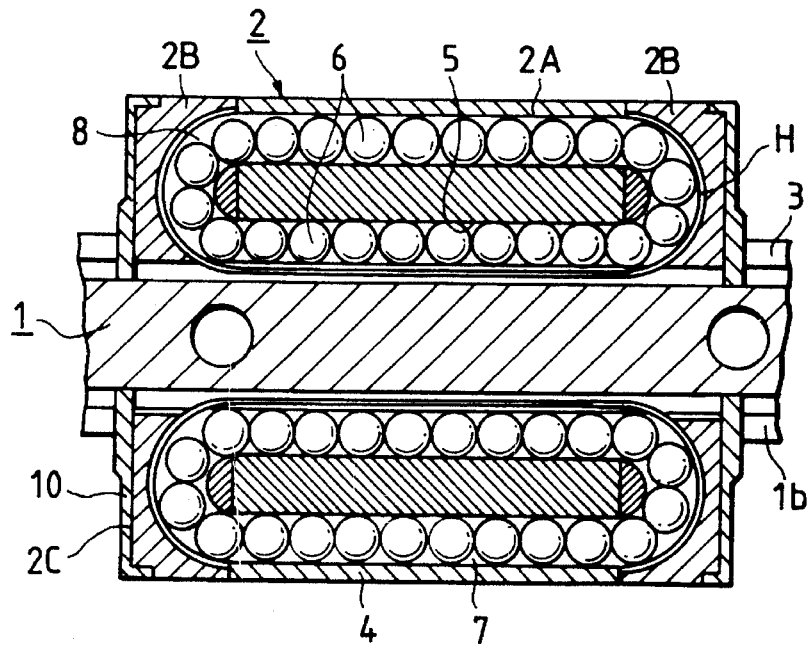
FIG. 6 is a sectional view taken in the direction of the arrows substantially along line VI—VI in FIG. 5.

Preferred embodiments of the present invention will be described with reference to FIGS. 1 through 4(b), in which parts corresponding functionally to those which have been described with reference to FIGS. 5 and 6 are therefore designated by the same reference numerals or characters.

Figure 1:
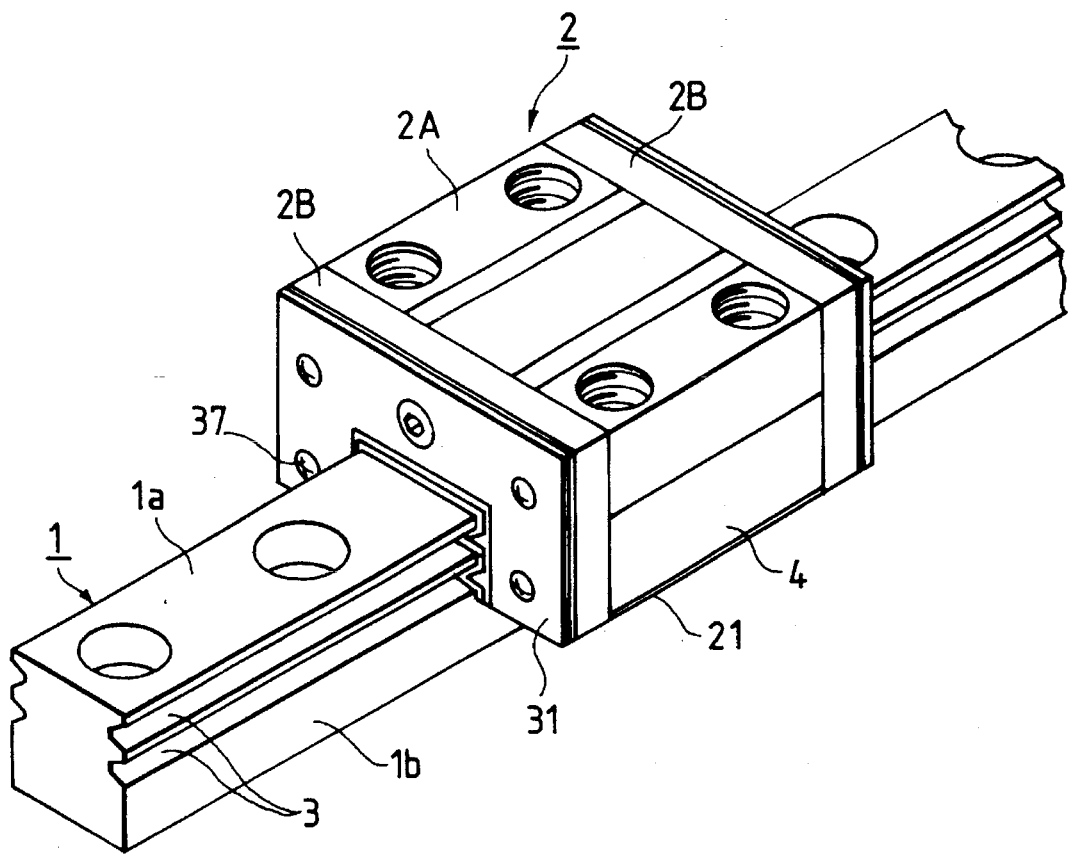
FIG. 1 is a perspective view showing a linear guide with a seal device which constitutes an embodiment of the present invention.
Figure 2:
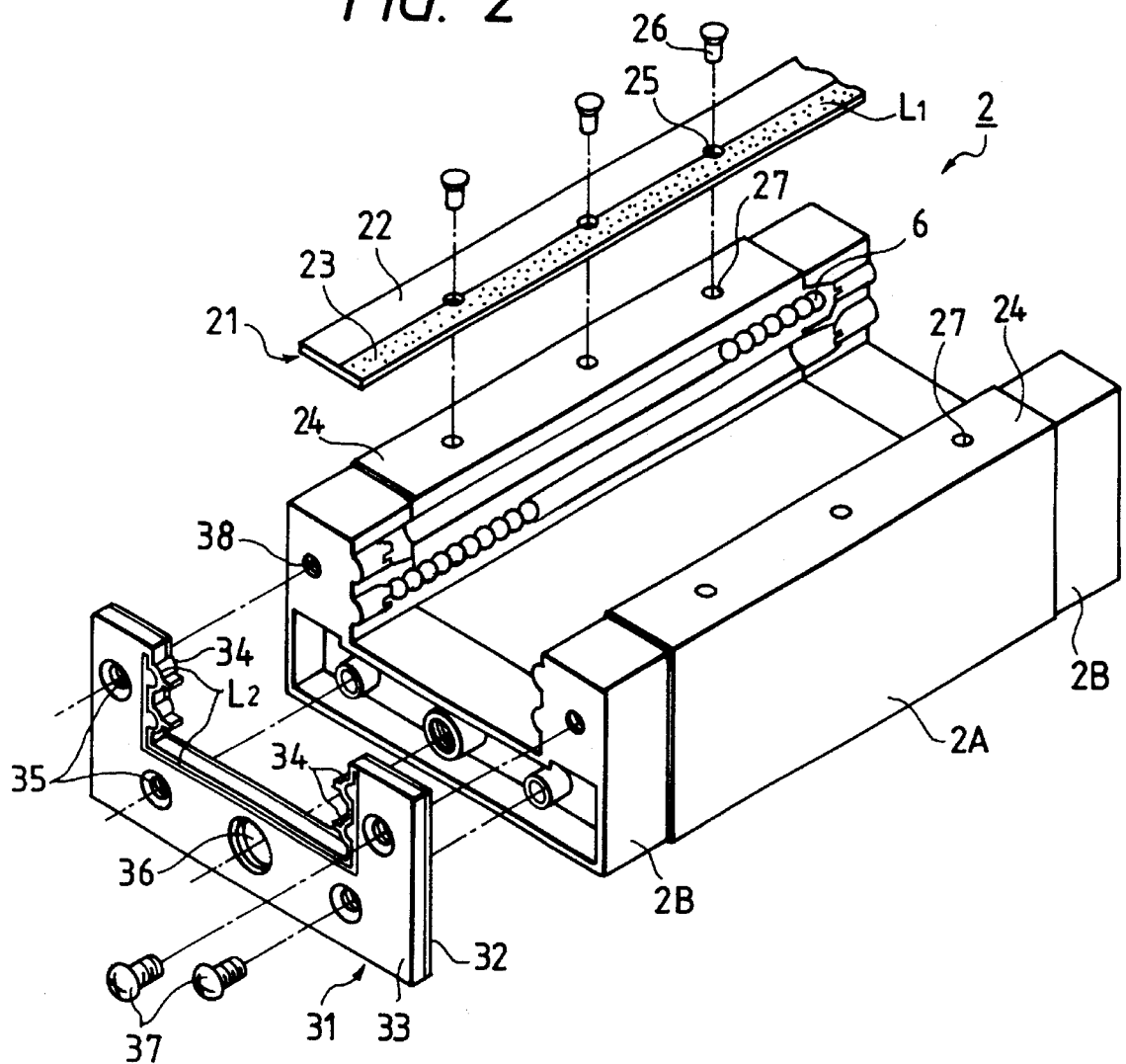
FIG. 2 is an exploded perspective view of a slider forming the linear guide as viewed from below.

In a linear guide according to the present invention, as shown in FIGS. 1 and 2, each of a pair of under seals 21 (only one under seal 21 shown in FIG. 2) provides: an under seal reinforcing plate 22; and a seal body 23 made of rubber or synthetic resin, which respectively contains a lubricant, and fixedly formed on the under seal reinforcing plate 22.

The under seal reinforcing plate 22 is an elongated steel plate which is substantially equal in length to the slider 2, and is somewhat larger in width than the lower surfaces 24 of the wings 4 of the slider body 2A, so that its inner edge portion hangs slightly over the inner edge of the lower surface 24 of the wing 4. Each of the under seals 21 has mounting holes 25 which are arranged longitudinally at intervals.

The seal body 23 is of the rubber or synthetic resin containing the lubricant as was described above. The seal body 23 is fixedly secured to the under seal reinforcing plate 22 by welding or bonding so that it is located on the inner edge portion of the under seal reinforcing plate 22, thus providing a thin seal lip $L_1$.

Each of the side seals 31 (only one side seal 31 shown in FIG. 2) is U-shaped, including a U-shaped side seal reinforcing plate 32, and a U-shaped seal body 33 formed thereon. More specifically, the side seal reinforcing plate 32 is a thin steel plate which is U-shaped in correspondence to the configuration of the end cap 2B. Similarly as in the case of the above-described seal body 23 of the under seal 21, the seal body 33 of the side seal 31 is of the rubber or synthetic resin containing the lubricant, and is fixedly secured to the side seal reinforcing plate 32 by welding or bonding.

The U-shaped seal body 33 has protrusions 34 on the inner edges of its two legs which are confronted with each other or faced to the side surfaces of the guide rail 1 so that the protrusions 34 are engaged with the ball rolling grooves 3 in the side surfaces of the guide rail 1, respectively. The inner edge portion of the U-shaped seal body 33 which slidingly contacts with the outer surfaces (i.e., the upper and side surfaces) of the guide rail is formed into a seal lip $L_2$. A plurality of mounting holes 35 for mounting the side seal 31 on the end cap 2B are formed in the side seal 31, and in addition one grease nipple mounting hole 36 is formed in the same side seal 31.

Now, mounting the under seals 21 and the side seals 31 on the slider 2 will be described.

First, the under seals 21 are mounted as follows:

The end caps 2B are mounted on both end faces of the slide body 2A, respectively. Thereafter, the under seals 21 are placed on the lower surfaces 24 of the right and left wings 4 of the slider body 21, respectively, with the seal bodies 23 faced to each other. Under this condition, the under seals 21 are fixedly secured to the wings 4 by hammering rivets 27 into the rivet holes 27 formed in the wings 4 of the slider body 2A. The seal lips $L_1$ of the seal bodies 23 thus secured are slightly protruded inwardly from the inner edges of the lower surfaces 24 of the wings 4, thus being in contact with the side surfaces 1b of the guide rail 1.

Thus, the under gaps, which are formed between the lower surfaces of the right and left wings 4 and the right and left side surfaces 1b of the guide rail 1, have been closed with the under seals 21; that is, the entrance of foreign matters such as dust through the under gaps is completely prevented with the under seals 21.

On the other hand, the side seals 31 are mounted on the slider 21 as follows:

Screws 37 inserted into the mounting holes 35 of the side seals 31 are screwed into threaded holes 38 formed in the end caps 2B, so that the side seals 31 are fixedly secured to the front and rear end faces of the slider 1, respectively. When the side seals 31 have been mounted on the slider 2 in the above-described manner, their seal lips $L_2$ protruding towards the guide rail 1 contact with the upper surface 1a and the right and left side surfaces 1b of the guide rail 1 and the side surfaces of the ball rolling grooves 3.

Thus, the side gaps, which are formed between the guide rail 1 and the front and rear end faces of the slider 2, have been closed with the side seals 31; that is, the entrance of foreign matters such as dust through the side gaps is completely prevented with the side seals 31.

The sliding surfaces of the under seals 21 and the side seals 31, namely, the seal lips $L_1$ and $L_2$, being part of the lubricant-contained seal bodies 23 and 33, are self-lubricative, and they are therefore considerably low in slide resistance.

If the linear guide is used under the circumference that foreign matters such as wooden particles and molding powder sprinkle over it at all times, the lubricant may be partially absorbed by the foreign matters. However, the linear guide is maintained satisfactorily lubricated because the lubricant is kept supplied from the lubricant-contained seal bodies 23 and 33 at all times.

In the above-described embodiment, the grease nipple is normally closed with a blind plug; however, it goes without saying that, when necessary, the grease nipple may be opened to supply the lubricant such as grease into the slider 2.

Furthermore, in the above-described embodiment, the under seals 21 are secured to the slider body 2A with rivets 26; however, the present invention is not limited thereto or thereby. That is, instead of the rivets, screws may be employed. In this case, instead of the rivet holes, threaded holes should be formed. Furthermore, the under seals may be so modified that they are fixedly fitted in the right and left wings of the slider body. That is, the under seals may be mounted in various manners without departing from the present invention.

Figure 3A:
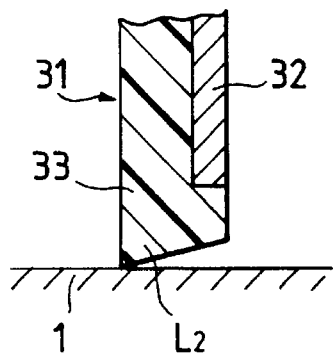
FIGS. 3(a) through 3(c) of are sectional views showing essential components of three modifications of a side seal according to the present invention.
Figure 3B:
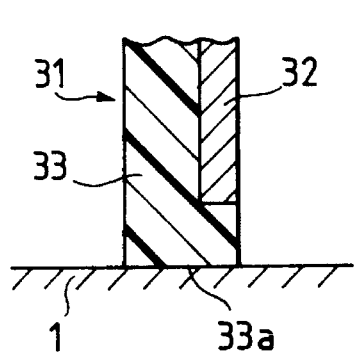
Figure 3C:
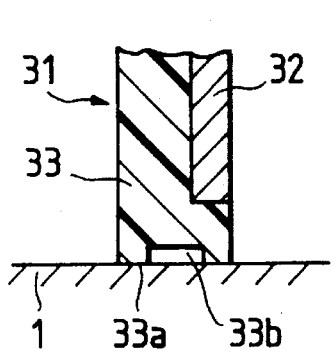

The side seal 31 may be modified as shown in FIGS. 3(a) through 3(c).

In a first modification of the side seal 31 shown in FIG. 3(a), the seal body 33 containing the lubricant covers the end of the side seal reinforcing plate 32, and its lip $L_2$ has a sliding seal surface which is sloped with respect to the surface of the guide rail so that it is readily elastically deformed while sliding on the surface of the guide rail.

In a second modification of the side seal 31 shown in FIG. 3(b), similarly as in the case of the first modification, the seal body 33 covers the end of the side seal reinforcing plate 32; however, the sliding seal surface of the lip is not sloped with respect to the surface of the guide rail because the seal body 33 containing the lubricant is self-lubricative and is therefore low in slide resistance. That is, the lip has a sliding seal surface 33a which is flushed with the surface of the guide rail 1. With the second modification, since the sliding seal surface 33a of the seal body 33 completely contacts with the surface of the guide rail 1, the seal body 33 is improved in wear resistance.

A third modification of the side seal 31 is obtained by further modifying the above-described second modification. That is, as shown in FIG. 3(c), a groove 33b is formed in the middle of the sliding seal surface 33a of the seal body 33 of the second modification to divide the sliding seal surface 33a into two parts which contact with the surface of the guide rail 1. The third modification is able to more positively prevent the entrance of foreign matters than the first modification shown in FIG. 3(a) in which one linear edge portion of the lip contacts with the surface of the guide rail 1. Further, the lubricant is stored in the groove 33b, the sliding performance of the side seal 31 can be improved.

In addition, the under seal 21 also may be modified in various manners.

A first modification of the under seal 21 is as shown in FIG. 4(a). In the first modification, the upper surface of the under seal reinforcing plate 22 is covered, in its entirety, with the seal body 23 containing the lubricant so that a seal surface 23a (the seal lip $L_1$) is slightly protruded hanging over the inner edge of the under seal reinforcing plate 22. The rivet holes 25 are formed in the under seal 21 so that they are extended through both the under seal reinforcing plate 22 and the seal body 23. In the modification, the rivet heads are held sunk in the seal body 23, and therefore the thickness of the under seal reinforcing plate 22 can be decreased as much as the thickness of the seal body 23. In addition, with the modification, the seal surface 13a of the seal body 23 is readily elastically deformed when slid on the surface of the guide rail 1.

A second modification of the under seal 21 is obtained by further modifying the first modification. That is, as shown in FIG. 4(b), a number of recesses 23b such as circular recesses and rectangular recesses are formed in the seal surface 23a of the seal body 23 to have the same effect as the third embodiment of the side seal 31 shown in FIG. 3(c).

While the present invention has been described with reference to the linear guide; however, it should be noted that the present invention is not limited thereto or thereby. That is, the technical concept of the present invention may be applied any linear guide of the type that the slider is laid over the guide rail. For instance, in the above-described embodiment, two ball rolling grooves 3 are formed in each of the two side surfaces of the guide rail; however, the present invention is not limited thereto or thereby. That is, the technical concept of the present invention may be equally applied to a linear guide in which one ball rolling groove or more than two ball rolling grooves are formed in each of the two side surfaces of the guide rail. In this case, it goes without saying that the protrusions 34 on the two legs of the U-shaped seal body 33 should be provided as many as the ball rolling grooves 3.

Furthermore, although the balls are used as the rolling elements in the above-described embodiments, the technical concept of the present invention may be applied to a linear guide in which the slider is slid through rollers instead of the balls.

As described above, the seal device of the linear guide has the seal lip which is made of the rubber or synthetic resin containing the lubricant so that the seal lip contacts with the surface of the guide rail to close the gaps between the outer surface of the guide rail and the inner surface of the slider. Hence, the lubricant is continuously supplied from the seal body to the drag surfaces of the linear guide at all times. Therefore, even if the linear guide is operated under the circumference that foreign matters such as wooden particles and molding powder sprinkle over it, the wear rate of the linear guide is not accelerated particularly, and the friction is kept low. Thus, the linear guide is maintained high both in operability and in dust proof.

In a conventional linear guide of grease-injection type, only a part of the grease is used. On the other hand, in the linear guide having the seal device according to the present invention, almost all the lubricant contained therein is utilized, so that lubrication of the linear guide is unnecessary for a long period of time. Furthermore, the lubricant, being contained in the seal body, is not in contact with air, and is therefore not deteriorated by oxidation. Those effects contribute to improvement of the maintenance of the linear guide, increasing the service life thereof.

While there has been described in connection with the preferred embodiments of the present invention, it will be obvious to those skilled in the art that various changes and modifications may be made therein without departing from the present invention, and it is aimed, therefore, to cover in the appended claim all such changes and modifications as fall within the true spirit and scope of the present invention.

What is claimed is:

1. A linear guide comprising:

a guide rail having a first rolling groove which is extended axially;

a plurality of rolling elements;

a slider including a second rolling groove confronted with said first rolling groove, a returning path in parallel with said second rolling groove and an arcuate path communicating said second rolling groove with said returning path, and said slider being moved on said guide rail through said rolling elements rolling in said second rolling groove; and a seal device secured to said slider for closing a gap between an inner surface of said slider and an outer surface of said guide rail, wherein said seal device includes a seal lip made of a lubricant-contained material selected from a rubber and synthetic resin, and said seal lip contacts with said outer surface of said guide rail to close said gap between said inner surface of said slider and said outer surface of said guide rail.

2. The linear guide of claim 1, wherein said slider includes right and left wings so that said slider is substantially U-shaped in section.

3. The linear guide of claim 2, wherein said seal device is provided on a lower surface of each of said right and left wings, said seal device comprises an under seal reinforcing plate and a seal body including said seal lip and fixedly formed on said under seal reinforcing plate, and said under seal reinforcing plate is an elongated steel plate which is substantially equal in length to said slider and which is larger in width than said lower surface of each of said right and left wings so that an inner edge portion of said under seal reinforcing plate hangs over an inner edge of said lower surface of each of said right and left wings.

4. The linear guide of claim 3, wherein an upper surface of said under seal reinforcing plate is covered with said seal body containing the lubricant so that said seal lip is protruded hanging over said inner edge portion of said under seal reinforcing plate.

5. The linear guide of claim 4, wherein said seal lip comprises a plurality of recesses formed in a sliding seal surface which contacts with said outer surfaces of said guide rail.

6. The linear guide of claim 2, wherein said seal device is provided on a side surface of said slider perpendicular to said guide rail, said seal device comprises a side seal reinforcing plate U-shaped corresponding to the sectional configuration of said slider, and comprises a seal body including said seal lip and fixedly formed on said side seal reinforcing plate, and said seal body includes a protrusion engaged with said first rolling groove in said outer surface of said guide rail.

7. The linear guide of claim 5, wherein said seal body containing the lubricant covers an end of said side seal reinforcing plate, and said seal lip has a sliding seal surface which is flushed with said outer surface of said guide rail.

8. The linear guide of claim 5, wherein said seal body containing the lubricant covers an end of said side seal reinforcing plate, and said seal lip has a sliding seal surface forming a groove in the middle thereof to divide said sliding seal surface into two parts which contact with said outer surface of said guide rail.

9. The linear guide of claim 6, wherein said seal body containing the lubricant covers an end of said side seal reinforcing plate, and said seal lip has a sliding seal surface which is sloped with respect to said outer surface of said guide rail.

* * * * *

UNITED STATES PATENT AND TRADEMARK OFFICE
CERTIFICATE OF CORRECTION

PATENT NO. : 5,494,354
DATED : February 27, 1996
INVENTOR(S) : Toru Tsukada

It is certified that error appears in the above-indentified patent and that said Letters Patent is hereby corrected as shown below:

Column 8, line 15, change "5" to --6--.

Column 8, line 19, change "5" to --6--.

Signed and Sealed this

First Day of July, 1997

Attest:

BRUCE LEHMAN

*Attesting Officer*    *Commissioner of Patents and Trademarks*